ated, silicic acid or silicate having a whiteness according to Berger at a wave length of 460 mμ of about 90 to about 95% and a specific surface area of about 30 to about 800 m²/g BET.

United States Patent [19]
Achenbach et al.

[11] 4,190,632
[45] Feb. 26, 1980

[54] PROCESS FOR TREATING AIR-BORNE (METALLIC) DUSTS CONTAINING SILICON DIOXIDE TO FORM PRECIPITATED SILICIC ACIDS AND SILICATES

[75] Inventors: Karl Achenbach, Frankfurt; Gunter Turk, Hanau, both of Fed. Rep. of Germany

[73] Assignee: Deutsche Gold- und Silber-Scheideanstalt vormals Roessler, Frankfurt am Main, Fed. Rep. of Germany

[21] Appl. No.: 775,217

[22] Filed: Mar. 7, 1977

[30] Foreign Application Priority Data

Mar. 10, 1976 [DE] Fed. Rep. of Germany ....... 2609831

[51] Int. Cl.² ................. C01B 33/26; C01B 33/12
[52] U.S. Cl. ................. 423/118; 106/288 B; 423/158; 423/179; 423/215.5; 423/329; 423/331; 423/334; 423/339
[58] Field of Search ............... 423/158, 179, 208, 210, 423/215.5, 326–334, 339, 118; 210/63; 106/288 B

[56] References Cited

U.S. PATENT DOCUMENTS

| 3,017,347 | 1/1962 | Kratz | 210/63 R |
|---|---|---|---|
| 3,085,861 | 4/1963 | Thornhill et al. | 423/339 |
| 3,489,586 | 1/1970 | Chapman et al. | 423/118 |

FOREIGN PATENT DOCUMENTS

| 39-27314 | 11/1964 | Japan | 423/334 |
|---|---|---|---|
| 48-16438 | 5/1973 | Japan | 423/332 |
| 49-134593 | 12/1974 | Japan . | |
| 49-134599 | 12/1974 | Japan . | |
| 50-119000 | 9/1975 | Japan | 423/334 |

Primary Examiner—Edward J. Meros
Attorney, Agent, or Firm—Beveridge, De Grandi, Kline & Lunsford

[57] ABSTRACT

There is provided a process for treating air-borne dust containing silicon dioxide in order to form a silicic acid or a silicate. The air-borne dust is dissolved in an alkali metal hydroxide solution to form an alkali metal silicate solution. The alkali metal silicate solution is purified by treating it with activated charcoal and/or oxidation agents. Non-decomposable substances remaining after the purification step are removed from the alkali metal silicate solution. The alkali metal silicate solution is then reacted with acids and/or salts of aluminum, magnesium and calcium. The resulting product is then filtered, washed and dried, and then comminuted to form a finely divided, amorphous, substantially pure, precipitated, silicic acid or silicate having a whiteness according to Berger at a wave length of 460 mμ of about 90 to about 95% and a specific surface area of about 30 to about 800 m²/g BET. The resulting products are useful as reinforcing fillers in the rubber and plastics industries, as well as additives in the paint, varnish, lacquer, paper, cosmetic, pharmaceutical, feed and pesticide industries.

8 Claims, No Drawings

PROCESS FOR TREATING AIR-BORNE (METALLIC) DUSTS CONTAINING SILICON DIOXIDE TO FORM PRECIPITATED SILICIC ACIDS AND SILICATES

BACKGROUND OF THE INVENTION

1. Field of the Invention

This invention relates to a process for treating airborne dusts containing silicon dioxide in order to convert the silicon dioxide into a silicic acid or a silicate. The air-borne dust is suitably a waste product from a silicon metal or silicon alloy production process and usually harmful to the environment.

2. Prior Art

Several processes are known for the production of alkali silicates, from the aqueous solutions of which (water glass) finely dispersed silicic acids and silicates are obtained by means of acid silica gel or by special precipitation methods.

One of these processes is known as the dry process, which is practiced generally today. In it, silicon dioxide (quartz) is caused to react with soda in a melt. In another process known as the wet process, quartz-sand is made to react under pressure with an aqueous alkalihydroxide solution.

The dry process has the disadvantage that for carrying out the reaction in the molten state, a great expenditure of heat energy is required. In addition, the melting process requires very expensive apparatus, and furnaces and melting tanks are exposed to great wear because of the high operating temperatures required. It is characterized in addition by a particularly careful selection of the silicon dioxide material, especially with a view toward the content of iron and aluminum oxide.

In the case of the wet method, the conversion is difficult to carry out quantitatively, because when natural sand is used, it reacts only incompletely and relatively slowly. According to this wet processing, one can only operate discontinuously and thus work intensively. The resulting water glass is dilute and has a low modulus ($SiO_2:Na_2O$), which means an increased use of alkali. In addition, the yield is poor since the conversion does not take place quantitatively.

In order to avoid some of these disadvantages, the relatively easily reacting, naturally occurring volcanic sands are used increasingly as starting silicic acid material.

For the production of particularly pure alkali silicates, especially for scientific purposes, it has been proposed to use pyrogenically produced, chemically pure, amorphous silicic acid as a starting product. This use, however, is disadvantageous because the alkali silicate produced may only be used for special purposes due to the high cost of the starting material.

Therefore, for the production of water glass from as cheap as possible raw materials, workers in the art have used waste silicic acids, such as those obtained from the $AlF_3$-process from $H_2SiF_6$ and $Al(OH)_3$: in the case of acid decomposition of raw phosphates for the production of phosphoric acid, phosphates and fertilizers, there develops as a by-and waste product volatile silicon tetrafluoride.

Precipitated in water, hexafluoro silicic acid is formed from this, which may be processed further to valuable fluoro compounds. In case of such processes for the production of $Na_3AlF_6$, $AlF_3$, $NaF$ and $HF$ basically silicic acid is obtained as a by-product. The separated silicic acid may be reprocessed according to a known process (Germ. Pat. No. 2,219,503) to water glass with limited stability and with a high modulus, but without complete removal of the fluoride present. The precipitated silicic acids, which may be produced from this, contain corresponding quantities of fluoride and may thus only have a limited use. Thus, for example, they may not be used for pharmaceutical preparations and as fodder and/or food additives. After it has become possible to produce water glass from $SiO_2$-containing waste products stemming from the decomposition of raw phosphates also other waste products containing high amounts of $SiO_2$ have been processed into water glass according to known methods.

A large quantity of volatile gases, which initially contain silicon mon-oxide, develop during the production of silicon metal, silicon alloys, silicides and Si-carbide, which are produced in an electro furnace by metallurgical processes. These gases, upon access to atmospheric oxygen, oxidize into a highly dispersed silicon dioxide. Additionally, the reaction gases also contain solid impurities, which together with the $SiO_2$ are separated in considerable quantities as air-borne dust from the exhaust gases. The resulting fine powder has a high content of amorphous $SiO_2$. At the same time, the impurities contained in the starting mixture, such as sulfur and phosphorus, are frequently present in the air-borne dust. The carbon used as a reducing agent in the form of, for example, graphite electrodes, also in part gets into the waste gas in a finely distributed form and gives the air-borne dust a blackish gray color. Furthermore, the separation products contain impurities originating from the reaction of quartz with, for example, petroleum coke, as well as among other things organic substances liberated by thermal decomposition from the bituminous coal tar or dextrines used as a binder in the electrode material, which reach the $SiO_2$-containing exhaust gas as cracking products. During the separation of the air-borne dust from the waste gas, these impurities are firmly absorbed by very finely distributed silicic acid.

This air-borne dust waste is obtained in considerable quantities: for instance, in case of the production of 1 ton of silicon-iron alloy by reduction, 0.2-0.5 tons of dust will develop. The reuse of this dust as a substitute for quartz has, to be sure, been attempted, but it has not been very profitable because of the necessity of a granulating process. Since, hiterto, no significant technically and economically practical possibility of use has resulted, the air-borne dust waste is either blown in the form of smoke into the atmosphere and constitutes a main cause for air pollution or it is collected and introduced into the sea or into rivers or moved to a dump, depending on the location of the factory. These measures still result in annoyances because of the high degree of fine distribution of the dust.

To be sure, the reprocessing of fine powdery, amorphous silicic acid by decomposition with alkali hydroxides in the wet process has already been proposed, because silicic acid is obtained in the production of silicon metal or its alloys as an industrial waste in large quantities. At the same time, silica gel is obtained from these finely powdered, amorphous silicic acid containing air-borne dusts by way of water glass by means of acids. The silica gel, because of the previously mentioned impurities, does not correspond to the conditions demanded most, and therefore may only be used to a very limited extent in some areas of application.

Up to this time these air-borne dusts polluting the environment could not be supplied to any kind of sufficient, technical use despite all efforts made (cf. European Chemical News, 10, 1, 1975, p. 15).

Therefore, there exists a need in the art for a process for the reprocessing of silicon dioxide-containing air-borne dust waste contaminating (polluting) the environment, such wastes emanating from silicon metal and silicon alloy production processes. There is a need to convert the silicon dioxide into silicic acids and silicates, which represent high grade products with a wide range of uses, for example, as reinforcing fillers in the rubber and plastics sector, as well as in many other fields, such as in the paint, varnish, lacquer, paper, cosmetic and pharmaceutical industries, as well as in feed and pesticide production.

SUMMARY OF THE INVENTION

Accordingly, this invention fulfills these needs in the art by providing a process for treating air-borne dust containing silicon dioxide in order to convert the silicon dioxide into a silicic acid or a silicate, wherein the air-borne dust is a waste product from a silicon metal or silicon alloy production process and is harmful to the environment. The process comprises the following stages:

Stage I. Dissolving said air-borne dust in an alkali metal hydroxide solution at a temperature of about 60° to about 110° C. in order to form an alkali metal silicate solution having a high modulus ($SiO_2$:$Me_2O$);

Stage II. (A) Purifying said alkali metal silicate solution from Stage I by treating said solution with activated charcoal, at least one oxidation agent, or mixtures of activated charcoal and oxidation agents, in order to remove organic compounds from said solution and to form a non-decomposable residue;

(B) Separating said non-decomposable residue from said alkali metal silicate solution;

Stage III. (A) Reacting said alkali metal silicate solution with at least an acid, aluminum salt, magnesium salt, calcium salt, or mixtures of said acids and salts, at a temperature of about 60° to about 110° C. and at a pH of 1 to about 12 to thereby form a precipitate;

(B) Filtering, washing, drying and comminuting said precipitate to form a finely divided, amorphous, substantially pure, precipitated silicic acid or silicate having a whiteness according to Berger at a wave length of 460 mµ of about 90 to about 95% and a specific surface area of about 30 to about 800 m²/g BET.

DETAILED DESCRIPTION

For the production of the precipitated silicic acid or silicates one employs effectively a sodium silicate solution or potassium silicate solution or their mixtures, having a mole ratio of $SiO_2$:$Me_2O$ of about 3.3 to about 5.0:1. For special purposes, a lithium silicate solution of similar mole ratio can be employed.

For the elimination of the impurities from the alkali metal silicate solutions resulting from the decomposition process, one can use hydrogen peroxide or alkali metal peroxide, preferably $Na_2O_2$, as an oxidation agent. These substances can be added during the decomposition, shortly prior to the separation of the non-decomposable residue, or shortly afterwards.

In a particularly advantageous embodiment, the activated charcoal treatment is accomplished for a short time prior to separation of the non-decomposable residue of the alkali metal silicate solution, or the activated charcoal treatment is combined with the oxidation agent treatment.

A preferred charcoal is a product produced at red heat by steam activation from pure charcoal, with a water content of <10%, a surface area according to BET in the range of about 600 to about 800 m²/g, a pH value of about 9–10 pH-measurement of the aqueous phase of a heat-extracted and thereafter decanted charcoal suspension by glass-electrode electrometry, and a fineness of grind in which about >80% of the particles are below about 40 microns.

The process of this invention represents a composite process, which takes its course in three steps:

Stage I. Decomposition process, in which the air-borne dust is dissolved with alkali metal hydroxide solution to form an alkali metal silicate solution with high modulus ($SiO_2$:$Me_2O$).

Stage II. Purification of the alkali metal silicate solution (water glass) obtained from Stage I, by treatment with activated charcoal and/or oxidation agents and separation of the purified alkali metal silicate solution from the residue by filtration.

Stage III. Precipitation of the amorphous silicic acid or amorphous silicates (For example, alumo-silicates, magnesium silicates, calcium silicates) by means of acids and salts.

As a proof of the technical progress of the process of this invention, a comparison of the power requirements for the production of precipitated silicic acid from sand, soda and acid via the traditional melting process (A) and via the wet process of this invention (B) from FeSi-air-borne dust, caustic soda solution and acid, has been made.

Table 1, shows the numerical values, standardized for kcal/kg $SiO_2$ and determined arithmetically. The Table contains three horizontal rows of figures. The first row relates to the power requirement, which is to be expended per kg $SiO_2$, in the liquid water glass phase. The second row of numbers shows the energy requirement per kg $SiO_2$ from just this liquid water glass according to A and B. The third row of figures finally shows the sum of the first and second rows, and thus represents the total energy expenditure which must be made in order to produce highly dispersed, precipitated $SiO_2$ from sand or FeSi-air-borne dust according to processes A and B. In case of the processes A and B we are dealing with so-called disintegrated part processes; i.e., one starts out from the fact that the liquid water glass used for the precipitation of silicic acid is inserted cold into the process.

TABLE I

Comparison: Melt- and Wet Process

Energy Requirement

A: Melting or Vat Process from Sand and Soda with $SiO_2$ Precipitation

B: Wet Decomposition Process from FeSi-air-borne Dust and Coustic Soda Solution with $SiO_2$ Precipitation

| Process | A | B |
|---|---|---|
| Energy requirement for liquid glass kcal/kg in liquid glass | 1.310 (29%) | 412 (11.4%) |
| Energy requirement for precipitation silicic acid kcal/kg $SiO_2$* | 3.210 (71%) | 3.210 (88.6%) |
| Total energy requirement** | | |

TABLE I-continued

Comparison: Melt- and Wet Process

Energy Requirement
A: Melting or Vat Process from Sand and Soda with $SiO_2$ Precipitation
B: Wet Decomposition Process from FeSi-air-borne Dust and Coustic Soda Solution with $SiO_2$ Precipitation

| Process | A | B |
|---|---|---|
| kcal/kg $SiO_2$* | 4,520 (100%) | 3.622 (100%) |

*$SiO_2$ calculated 91%
**Energy requirement in case of the process of the invention B by 20% lower than in case of the conventional process A.

In comparing the numbers, it is furthermore remarkable that in the case of water glass production according to the melting or trough process, the energy requirement is 3.2 times higher than in case of the FeSi-wet decomposition process. While in case of the disintegrated process, in case of the same type of silicic acid, there arise no differences in energy requirement for the two $SiO_2$ precipitation processes worth mentioning. The picture changes in case of the integrated process, where the wet process has some slight advantages over the melting process. The reason for the advantage is that the concentrated water glass as in process A must be diluted with hot water prior to the $SiO_2$ precipitation; this is no longer required in case of process B.

Furthermore, in case of process A, the proportion of energy required for the production of liquid water glass still amounts to 29% of the total energy requirement. In the process of this invention, this proportion amounts to only 11.4%. Measured against the total energy requirement, it turns out that the (wet) process B of this invention results in 20% saving of energy vis-a-vis the current processing method A.

The technical progress of the composite process of this invention may still be proven numerically by a series of advantages vis-a-vis the hitherto practiced method of operation.

Commercial kinds of water glass, as produced according to the status of the prior art and from which, hitherto, fillers have been precipitated, have an $SiO_2$:$Na_2O$ ratio of max. 3.5. However, as the subsequent examples prove, mole ratios of more than about 3.5 to max. 5 can be achieved according to the process of this invention in a simple manner.

The considerable advantages of the use of water glass solutions with an increased modulus can be recognized from Table 2. The following advantages can be established for the composite process of this invention; to be sure, in case of:

Stage I. Saving of sodium hydroxide in case of decomposition of FeSi-air-borne dust.

Stage III. Reduced acid requirement in case of precipitation of silicic acids or silicates. Reduction of the sodium salt yield (for example, $Na_2SO_4$) and thus lower salt-carryover in the effluent. Reduction of the salt content in the filter cake and as a consequence less use (insertion) of wash water and shortened duration of washing (increase in capacity of the filter aggregates).

In case of the use of water glass with a modulus of 4.5:1 a quantitative improvement of 23% will result for all cited effects, and in case of a modulus of 5:1 an improvement of about 30% (Table 2).

TABLE 2

Savings in $H_2SO_4$ and NaOH as well as reduction of the yield of $Na_2SO_4$ in dependence on $SiO_2$-:$Na_2O$-module of the water glass used

| Module $SiO_2$ : $Na_2O$ | $H_2SO_4$ per 100 kg | | NaOH per 100 kg | | $Na_2SO_4$ per 100 kg | Saving related to the module 3.5:1 in % |
|---|---|---|---|---|---|---|
| | kg | ltr. (D=1.84) | Water Glass kg | $SiO_2$ kg | $SiO_2$ kg | |
| 3.4 : 1 | 48.0 | 26.1 | 30.1 | 39.2 | 69.6 | +3.0 |
| 3.5 : 1 | 46.7 | 25.4 | 29.4 | 38.1 | 67.6 | 0 |
| 3.6 : 1 | 45.4 | 24.7 | 28.8 | 37.0 | 65.7 | −2.8 |
| 3.8 : 1 | 43.0 | 23.4 | 27.6 | 35.1 | 62.3 | −7.8 |
| 4.0 : 1 | 40.8 | 22.2 | 26.5 | 33.3 | 59.1 | −12.6 |
| 4.2 : 1 | 38.9 | 21.1 | 25.5 | 31.7 | 56.3 | −16.7 |
| 4.4 : 1 | 37.1 | 20.2 | 25.5 | 30.3 | 53.8 | −20.4 |
| 4.6 : 1 | 35.5 | 19.3 | 23.7 | 29.0 | 51.5 | −23.8 |
| 4.8 : 1 | 34.0 | 18.5 | 22.9 | 27.8 | 49.3 | −27.1 |
| 5.0 : 1 | 32.7 | 17.8 | 22.1 | 26.7 | 47.4 | −29.9 |

On the basis of the following examples, the process will be explained in more detail without however remaining limited to the end products mentioned there. All parts, proportions, percentages and ratios are by weight unless otherwise indicated.

EXAMPLE 1

As a starting raw products there were employed:
(a) an air-borne dust obtained from Fe-Si-production and with the following data:

| Analysis: | Percentage |
|---|---|
| $SiO_2$ | 89.55 |
| $Fe_2O_3$ | 0.9 |
| $Al_2O_3$+MgO+CaO+$Na_2O$+$K_2O$ | 3.9 |
| SiC | 0.4 |
| C | 1.4 |
| loss at red heat | 3.2 |
| Bulk weight: | 250 g/l |
| Particle size: | below 60 μ |

(b) an air-borne dust obtained from Si-metal production and with the data:

| Analysis: | Percentage |
|---|---|
| $SiO_2$ | 97.5 |
| $Fe_2O_3$ | 0.1 |
| $Al_2O_3$+MgO+CaO+$Na_2O$+$K_2O$ | 2.1 |
| SiC | 0.3 |
| C | 1.4 |
| loss at red heat | 3.2 |
| Bulk weight: | 250 g/l |
| Particle size: | below 90 μ |

Stage I. Decomposition Process 5 liters of water are added to a (stainless steel vessel of 10 ltr capacity and are dissolved therein corresponding to the desired $SiO_2$:$Na_2O$ modulus, for example, 500 g NaOH. This is heated to 70°–90° C.) and for example, 0.85 kg of the product (a) with 89.55% $SiO_2$ is inserted while stirring with a high-power agitator. This is boiled for 1 hour and then 0.85 kg of the product (b) with an $SiO_2$ content of 97.5% is inserted. After a boiling time of 3 more hours, the residue is filtered off either by means of a suction or a pressure filter, by way of a perlon filter. In order to facilitate the filtration, the vessel was first refilled with hot water to a volume of 10 liters. In case of this decomposition, a calculated modulus of 4.1 $SiO_2$:1 $Na_2O$ from 1.59 kg $SiO_2$ (100%) and 0.388 g $Na_2O$ (from 500 g NaOH) was adjusted. A water glass with a modulus which lays at 4:1 (See Table 3, Experiment 2) was obtained.

Table 3 contains numerous further examples for the decomposition process which, as a rule, led to water glasses with a modulus in the range of 4:1 to 5:1.

can also be added instead of the sodium peroxide, and, indeed, after the filtration.

Stage III. Precipitation (silicic acid)

In order to carry out the third step of the composite process of this invention, 1880 l of water of 80° C. and 430 l of pure water glass solution with a density of 1.14 (Modulus = 4:1; $SiO_2 = 146.8$ g/l; $Na_2O = 38.3$ g/l) are put up in a vessel of 5 m³ capacity. Then 855 l of sodium silicate solution/h and 60 l concentrated sulfuric acid/h are fed into the recipient vessel at 85° C. within 85 minutes, and the precipitation is accomplished while stirring with an agitating mechanism at 400 rpm. The precipitation solution is then acidified with 30 l $H_2SO_4$ (conc)/h. The silicon dioxide obtained after separation of water, washing free of acid and drying with a yield of 228 kg is extremely finely dispersed and has the follow-

TABLE 3

| Experiment No. | Product a)=FeSi b)=Si-m | SiO₂ % i.p | SiO₂ kg | SiO₂ kg(100%) | NaOH or KOH kg | ltr.i. Filtrate | Analysis g/l Na₂O | Analysis | Module | Residue gr. | Residue % | Density water glass vol. | NaOH Proportion (KOH proport.) |
|---|---|---|---|---|---|---|---|---|---|---|---|---|---|
| 1 | a) | 89.55 | 0.896 | | 0.300 | 3.6 | 45.59 | 175.54 | 1:3.98 | 181 | 18.1 | 1.180 | 6 |
| 2 | a) 850g b) 850g | in 10% NaOH boiled 1 hour 89.55 97.5 | 1.7 | 1.599 | 0.5 | 5.6 | 52.375 | 201.26 | 1:3.99 | 240 | 14.1 | 1.197 | 10 |
| 3 | a) /50% b) | 89.55 97.5 | 1.7 | 1.599 | 0.500 | 5,080 | 56.56 | 223.95 | 1:4.091 | 215 | 12.6 | 1.225 | 10 |
| 4 | a) /50% b) | 89.55 97.5 | 1.7 | 1.599 | 0.500 | 5,200 | 45.97 | 190.20 | 1:4.29 | 305 | 18 | 1.190 | 10 |
| 5 | a) /50% b) | 89.55 97.5 | 1.7 | 1.599 | 0.500 | 5,980 | 45.71 | 182.79 | 1:4,13 | 297 | 17.5 | 1.188 | 10 |
| 6 | a) /50% b) | 89.55 97.5 | 1.7 | 1.599 | 0.500 | 6.400 | 48.55 | 200.29 | 1:4.26 | 220 | 13 | 1.196 | 10 |
| 7 | a) | | 1.70 | 1.58 | 0.35 | 3.20 | 49.59 | 229.16 | 1:4.77 | 457 | 26.8 | 1.23 | |
| 8 | a) 850g b) 850g | in 14.8% KOH boiled 1 hour | 1.7 | 1.599 | KOH 0.74 | 4.65 | K₂O 74.183 | 198.92 | 1:4.21 1.599 | 440 | 26 | 1.196 | 14.8 |
| 9 | a) 850g b) 850g | in 14.8% KOH boiled 10 min. | 1.7 | 1.599 | KOH 0.72 | 5.4 | K₂O 60.288 | 164.34 | 4:4.28 | 512 | 30 | 1.158 | 14.4 |
| 10 | a) 850g b) 850g | boiled 1 hour | 1.7 | 1.599 | 0.37 KOH 2.25 NaOH | 6.0 | Na₂O 32.35 K₂O 36.14 | 188.32 | 1 Na₂O: 2.3 K₂O: 6.32 1K₂O: 1.35 | 350 | 20.6 | 1.189 | 12.4 |

The reason for the use of air-borne dusts from both processes is that a decomposition from air-borne dust of Si-metal production can only be filtered with the greatest difficulty. On the contrary, the decomposition from air-borne dust of Fe-Si-production shows good filtration behavior, with quantities of residue lying however over (beyond) 20%. The blend thus represents a compromise, as a result of which the filtration behavior is improved and the quantities of residue can be lowered to below 20% (for example, 13-18%).

Stage II. Purification

In order to remove organic impurities of the above-described type, 33 g of activated charcoal are added to the water glass about 1 hour before the end of cooking (boiling) at the above-mentioned experimental conditions, which corresponds to a quantity of 3.3 g/l in relation to a 10 liter quantity.

In order to still improve the degree of purification, sodium peroxide in a quantity of 0.5 g/l is added after the addition of the activated charcoal to the decomposition solution. As an alternative processing method, 10 ml of hydrogen peroxide (35%) per liter of water glass ing parameters:

| | |
|---|---|
| pH value in 4% aqueous suspension (according to DIN 53 200) | 4.6 |
| Specific surface according to BET m²/g | 355 |
| Loss at red heat (according to DIN 52 911) (2 hours at 1000° C.) weight % | 9.09 |
| Bulk weight g/l | 158 |
| Bulking volume (according to DIN 53 194) ml/100 g | 633 |
| Na₂SO₄ weight % | 0.03 |
| Whiteness according to Berger at a wave length of 460 mm | 91.4 |
| DBP number % | 167. |

A water glass not treated with activated charcoal in the purification step B, resulted in a product which had a grayish brown coloring.

Instead of with sulfuric acid, the precipitation can also be accomplished with the use of other acidic reacting substances. Examples for these are carbon dioxide, hydrochloric acid and sodium bisulfate.

EXAMPLE 2 (SILICIC ACID)

The decomposition and purification process is carried out analogously to Example 1, whereby water glasses of Table 3 are used.

A water glass, obtained thus, is put up in a vessel with 5 m$^3$ capacity with 2028 l of water of 80° C. as a solution with a density of 1.14 (modulus=4:1; $SiO_2$=146.8 g/l; $Na_2O$=38.3 g/l). Then 45 l sulfuric acid solution (50%) are fed at 80° C. within 3 minutes in to the recipient vessel.

Then the reaction solution is allowed to react for 34 minutes while stirring at 1300 rpm.

The precipitation suspension is then acidified with 51 l $H_2SO_4$ (50%) in 3 minutes. The product (252 kg) which was separated from $H_2O$ and washed free of acid, is very finely dispersed and has the following parameters:

| | |
|---|---|
| pH value (according to DIN 53 200) | 4.1 |
| Specific surface according to BET m$^2$/g | 660 |
| Loss at red heat (according to DIN 92 911) (2 hours at 1000° C.) weight % | 9.3 |
| Bulk weight g/l | 517 |
| Bulking volume (DIN 53 194) ml/100 g | 193 |
| $Na_2SO_4$ weight % | 0.03 |
| Whiteness according to Berger at a wave length of 460 mm. | 92.5 |
| DBP number % | 142. |

A water glass not treated with activated charcoal and oxidation agents resulted in a product which had a grayish brown coloring.

Instead of with sulfuric acid, the precipitation can also be accomplished with the use of other acidic reacting substances. Examples for these are carbon dioxide, hydrochloric acid and sodium bisulfate.

EXAMPLE 3 (SILICIC ACID)

A water glass solution obtained from the decomposition process according to Example 1, with a density of 1.14 (modulus 4:1, $SiO_2$=146.8 g/l; $Na_2O$=38.3 g/l) is used as follows for the precipitation of a finely dispersed silicic acid:

Into a water preparation of 1160 l ($H_2O$ dist.), 38 l of NaCl are inserted and the water glass solution is added up to a pH-value of 8.5. A pH-value of 8.5 is maintained during the precipitation.

The precipitation then takes place by simultaneous feed of 100 l/h of water glass and 300 l/h of 3 n $H_2SO_4$ at a temperature of 80° C. while stirring by means of an agitating mechanism at 420 rpm, during a period of 120 minutes. After a waiting step of 15 minutes, this is acidified with 3 n $H_2SO_4$, then filtered. The filter cake is washed free of acid and dried.

A finely dispersed product at a yield of 240 kg is obtained, with the following data:

| | | |
|---|---|---|
| pH-value | | 6.3 |
| BET-surface m$^2$/g | | 250 |
| Loss at red heat at 1000° C. | weight % | 9 |
| Bulking volume | ml/100g | 169 |
| $Na_2SO_4$ | weight % | 0.03 |
| DBP number | % | 82. |

EXAMPLE 4 (AMORPHOUS SODIUM-ALUMINUM SILICATE)

The decomposition process (I) and the purification process (II) are carried out analogously to Example 1.

Then 9.1 l of water glass, diluted to a density of 1.115 (mole ratio 4.77:1) are put into a closed stirring container of acid-proof steel, with 50 l capacity equipped with a reflux cooler.

The preparation is heated indirectly with a gas burner to 90° C. and is kept at this temperature during the entire duration of the process.

Then 18 l of aluminum sulfate solution, density 1.025, are inserted within 75 minutes while stirring with a blade agitator. Subsequently, the suspension is mixed drop by drop while stirring at 90° C., with 157 ml of a 1:1 diluted sulfuric acid, until a pH-value of 2.8 is reached.

The precipitate is filtered off, by washing with water, it is freed of the salts developed during the reaction, and of excess acid. It is dried at 105° and is ground on a pinned disk mill.

1275 g of a soft, voluminous powder with the following characteristics, are obtained:

| | |
|---|---|
| Bulk weight, g/l | 135 |
| pH-value of the 4% by weight of aqueous suspension | 6.3 |
| BET surface, m$^2$/g | 420 |
| $SiO_2$, % by weight | 76 |
| $Al_2O_3$, % by weight | 6 |
| $Na_2O$ % by weight | 3 |
| Loss at red heat, % by weight | 14.8 |
| Whiteness according to Berger at a wave length of 460 mm. | 91.8. |

The primary particles are combined into secondary aggregates of 0.2 to 2 microns, on the average 1 micron, according to electron microscopy. Crystal structure: X-ray-amorphous.

EXAMPLE 5 (SILICIC ACID PRECIPITATION)

The decomposition process I and the purification process II are carried out analogously as in Example 1.

The 11.2 m$^3$ of 80° C. water are put into a precipitation vat of 20 m$^3$ capacity and are mixed up to a pH-value of about 11 with a diluted water glass solution. Then the above sodium silicate solution with a specific weight of 1.230 g/ml and a modulus of 4.77:1 and 96% sulfuric acid at 85.6 l of $H_2SO_4$/h are put simultaneously at 84° C. within 100 minutes into the recipient vessel. The inflow speed of the acid is about one third to one quarter of that of the alkali metal silicate solution. At the same time, a pH-value of 10–11.5 is maintained. The simultaneous addition of water glass and acid takes about 100 minutes. At that time, the precipitation suspension contains about 50 g $SiO_2$/l. It is then acidified to a pH-value of 3.0. About 700 kg of silicic acid are produced.

The silicon dioxide obtained after separation of the water and drying is extremely finely dispersed and has a specific surface of 220 m$^2$/g. The silicic acid has a whiteness according to Berger at a wave length of 460 m$\mu$ of about 92.8.

What is claimed is:

1. A process for treating air-borne dust containing silicon dioxide in order to convert the silicon dioxide into a silicic acid or a silicate, wherein the air-borne dust is a waste product from a silicon metal or silicon alloy production process and is harmful to the environment, said process comprising the following stages:

Stage I. Dissolving said air-borne dust in an alkali metal hydroxide solution at a temperature of about 60° to about 110° C. in order to form an alkali metal silicate solution having a high modulus ($SiO_2$:alkali metal oxide);

Stage II. Purifying said alkali metal silicate solution during or after Stage I by treating said solution with activated charcoal and at least one oxidation agent, separately or in admixture, said oxidation agent being selected from hydrogen peroxide and alkali metal peroxide, in order to remove organic compounds from said solution and to form a non-decomposable residue and separating said non-decomposable residue from said alkali metal silicate solution;

Stage III. (A) Reacting said alkali metal silicate solution with at least one acid, aluminum salt, magnesium salt, calcium salt, or mixtures of said acids and salts, at a temperature of about 60° to about 110° C. and at a pH of about 1 to about 12 to thereby form a precipitate;

(B) Filtering, washing, drying and comminuting said precipitate to form a finely divided, amorphous, substantially pure, precipitated silicic acid or silicate having a whiteness according to Berger at a wave length of 460 m$\mu$ of about 90 to about 95% and a specific surface area of about 30 to about 800 $m^2$/g BET.

2. Process according to claim 1 in which said alkali metal silicate solution is a sodium silicate solution, a potassium silicate solution, a mixture of sodium silicate and potassium silicate solutions, or a lithium silicate solution, having a mole ratio of $SiO_2$:alkali metal oxide of about 3.5 to about 5.0:1.

3. Process according to claim 1, in which said oxidation agent is added to said alkali metal silicate solution in Stage I, shortly prior to separation of the non-decomposable residue in Stage II or shortly after said separation.

4. Process according to claim 3, in which said alkali metal peroxide is sodium peroxide.

5. Process according to claim 3, in which said treatment with said charcoal is carried out for a short time prior to said separation of said non-decomposable residue in Stage II.

6. Process according to claim 1, in which said reacting in said Stage III (A) is carried out by reacting said alkali metal silicate with sulfuric acid or hydrochloric acid.

7. Process according to claim 1, in which said activated charcoal has a water content of less than about 10 weight percent, a specific surface area of about 600 to about 800 $m^2$/g BET, a pH-value of about 9-10 pH-measurement of the aqueous phase of a heat-extracted and thereafter decanted charcoal suspension by glass-electrode electrometry, and a fineness of grind such that more than about 80% of particles from said grind have a particle size below about 40 microns.

8. Process according to claim 4 in which said treatment with said charcoal is carried out for a short time prior to said separation of said non-decomposable residue in Stage II.

* * * * *